May 26, 1970 E. E. BITTMANN 3,514,767
THIN FILM MAGNETIC DATA STORE
Filed April 14, 1958 3 Sheets-Sheet 1
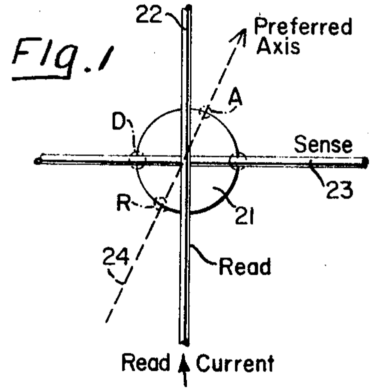
Fig. 2
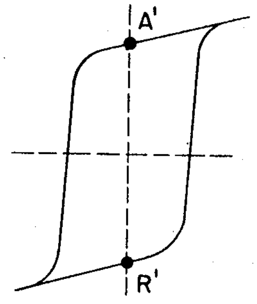
Fig. 3
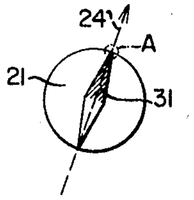
Fig. 4
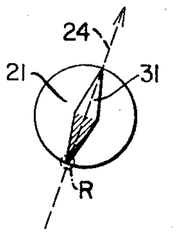
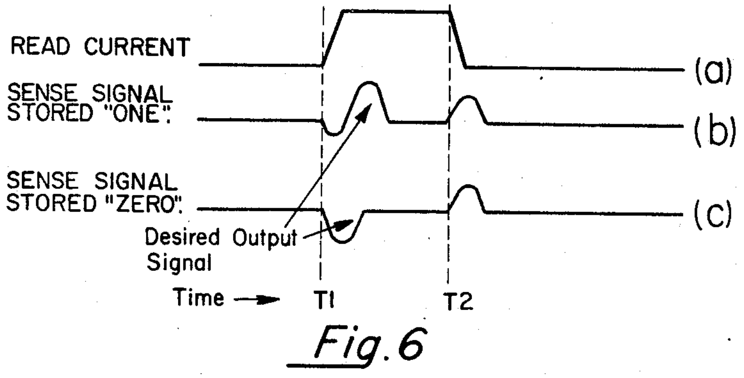
Fig. 6
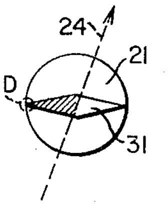
Fig. 5
Fig. 7
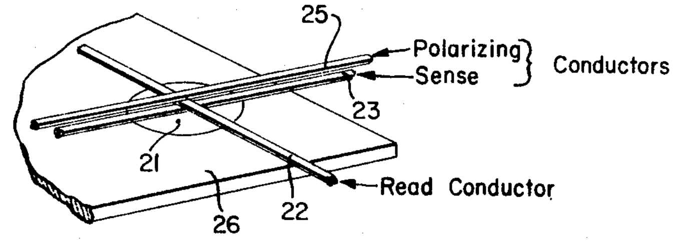
Fig. 10
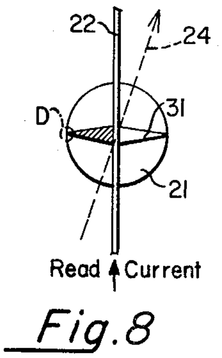
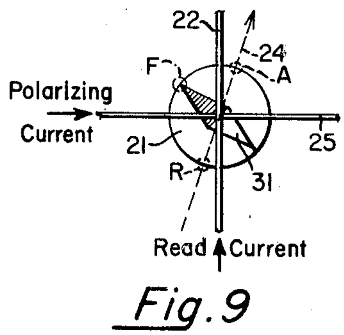
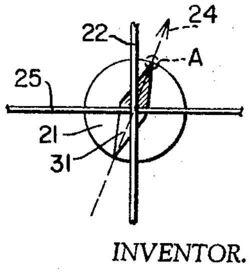
Fig. 8 Fig. 9
INVENTOR.
ERIC E. BITTMANN
BY
ATTORNEY

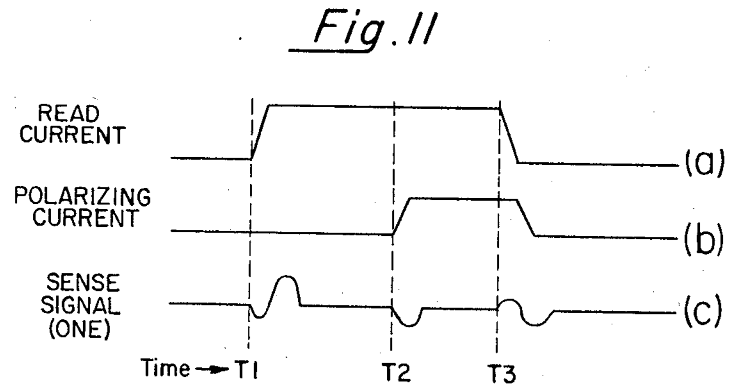
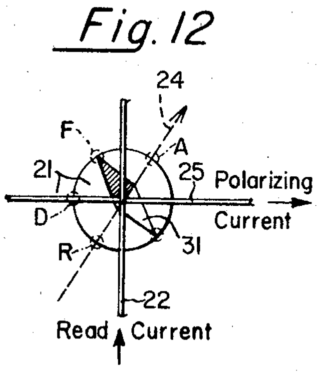
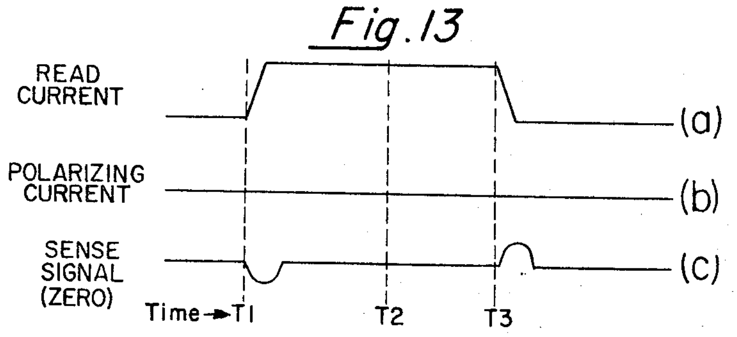
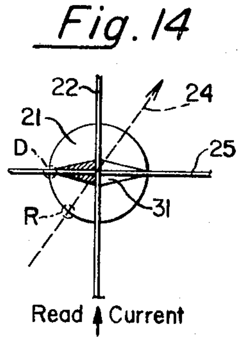
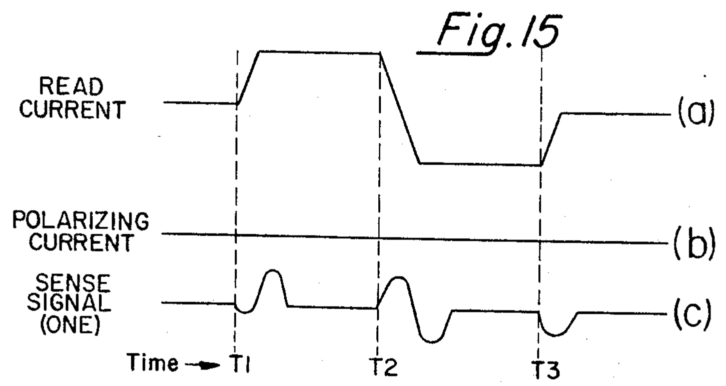
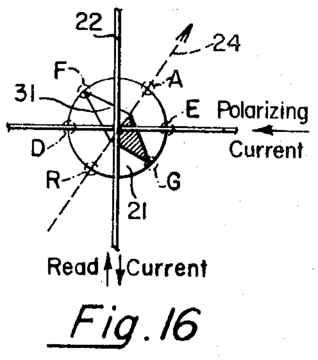
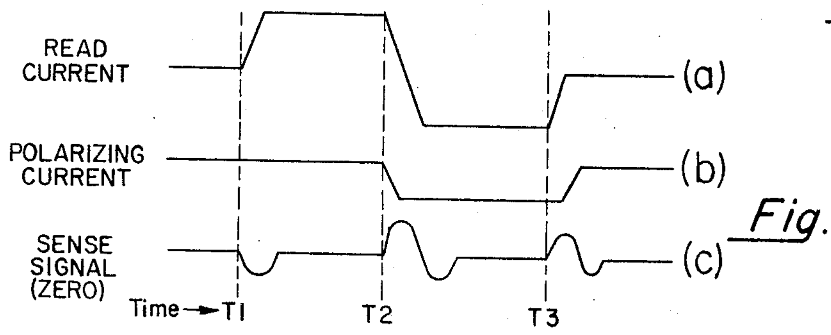
Fig. 17
INVENTOR.
ERIC E. BITTMANN
BY
J. Walter Schilpp
ATTORNEY

INVENTOR.
ERIC E. BITTMANN
BY
ATTORNEY

United States Patent Office 3,514,767
Patented May 26, 1970

3,514,767
THIN FILM MAGNETIC DATA STORE

Eric E. Bittmann, Downingtown, Pa., assignor to Burroughs Corporation, Detroit, Mich., a corporation of Michigan
Filed Apr. 14, 1958, Ser. No. 728,212
Int. Cl. G11c *5/02, 11/14*
U.S. Cl. 340—174 4 Claims

ABSTRACT OF THE DISCLOSURE

A thin film magnetic memory device in which a first conductor is disposed perpendicular to the preferred magnetic axis of the thin film to provide a low-level magnetic drive in the axial direction, while a second conductor is disposed generally along the preferred axis, but slightly skewed away from the axis, to provide a high-level magnetic drive perpendicular to the preferred axis with a small axial component. When only the second conductor is energized, the magnetic flux in the thin film is driven to a reference state, the direction of which is fixed by the direction of the axial component of the field produced by the second conductor, but when both conductors are energized, the small axial component of the second conductor is overcome by the axial drive of the first conductor and the magnetic flux is driven to the opposite direction.

My invention relates to improvements in the art of magnetic element data storage devices.

It is known in the art of electrical computation and digital data processing and control to store information of a binary nature in a magnetic element having, preferably, two preferred directions of magnetization, these directions having the same axis (hereinafter called the magnetic axis) and differing only in direction or (analytically expressed) in algebraic sign. Magnetization in one such direction is arbitrarily assigned a reference significance, e.g. that of zero for the value of a binary digit to be represented. The other direction is then considered to represent the alternate value-unity or one, for the digit in the example.

One way of using such a device is to set it to the reference condition and to arrange the circuitry so that if the digit to be stored has the reference value, the magnetic element is not affected; but if the digit has the alternate value, the magnetization of the magnetic element or core is changed in sign. Usually information thus stored is recovered by applying to the core a field sufficient in direction and magnitude to restore the core to, or leave it in, the reference condition. If the stored value was the alternate value, the core changes the sign of its magnetization and the flux reversal inherent in such change will induce a pulse of voltage in all conductors magnetically coupled to it, including the one producing the restoring field. If the stored value was the reference value, the core is very little affected by the restoring pulse, being driven slightly into saturation from its condition of remanence; the difference between remanence and saturation fluxes in many magnetic core materials commercially available is only a tenth or less of the flux change produced in reversal from remanence of one sign to saturation of the other sign. Thus, the change from remanence to saturation in the same direction is very easy to discriminate from such reversal. Known methods of storing data, applying the restoring field, and detecting the flux reversal, if one occurs (these processes being often known respectively, as "writing," "reading" or "restoring" and "sensing"), may employ one or more conductors for any one, any two, or all three of these functions.

Since a large capacity for storing data is a valuable property of a computing or data processing or control device, it is desirable for conservation of space to make the information storage cores small. This has the additional advantages of facilitating design for fast operation and reducing the power required to operate the core at a given speed. One satisfactory way of providing a large number of cores in small space is to employ films or layers of magnetic material having the properties before described, and to fix them in small strips or areas to a plane mounting surface; magnetic coupling to these films is then effected by fixing conductors near them, without wrapping coils around the elements according to more conventional techniques of the power and communication arts, and without passing conductors through the magnetic elements according to the techniques of assembling toroidal cores into memory arrays. Either of these two latter techniques requires relatively elaborate and complex handling of the conductors. Such operations are more time-consuming and expensive than the simple fixing of conductors in proximity to the cores. However, the use of a single conductor passing near a core does not give very strong coupling between the core and the conductor.

It has therefore been customary in the design of such devices to strive for a maximum coupling between the conductors and the core by placing the conductors as close to the core as feasible and by placing the conductors approximately at right angles to the magnetic axis of the core, in order that a current in the conductors may produce a magnetic field in the direction of the magnetic axis of the core, and that a maximum of flux from the core may link with the conductors. Such a configuration is described in "A Compact Coincident-Current Memory" by A. V. Pohm and S. M. Rubens, pp. 120–123, "Proceedings of the Eastern Joint Computer Conference," Dec. 10–12, 1936, New York, N.Y., published by the American Institute of Electrical Engineers, 33 W. 39th St., New York, N.Y.

This reference also mentions that application of a small auxiliary magnetic field at right angles to the direction of easy magnetization can produce switching by rotation of total magnetization in the plane of the core. FIG. 3 of that reference shows the hypothetical effect of various proportions of field components parallel and normal to the magnetic axis in producing rotational switching. However, the experimental results shown by plotted points cover only the range of field components which would correspond to application of magnetizing fields at angles with the magnetic axis ranging from zero to slightly less than forty-five degrees. In other words, the work published describes the use of a field transverse to the magnetic axis of the core only as an auxiliary field. It does not describe the operation of switching by application of a field as nearly as possible at right angles to the magnetic axis of the core. The reference states specifically (p. 122, top of center column) "One can provide a cross-field by using an additional winding or coil, or one can provide the cross-field by rotating the 'easy direction' of the magnetic element slightly with respect to the drive field." Slight rotation will provide only a transverse field component small in magnitude compared with the field component parallel to the magnetic axis of the core.

It is a characteristic of the data storage method hereinbefore described that reading of stored data is effected by performing on the core an operation which leaves the core in a standard condition which is always the same regardless of the condition of the core before reading. In other words, no matter what information was stored in the core before reading, the reading operation removes that information. If the information read out from the core is to be preserved in the core, the information must be recorded in the core once more. This operation is known as regeneration, by obvious etymology, and the sequence of events involved is called the regeneration cycle. The physical process consists in applying to any core which was in the alternate condition before being read, a magnetomotive force such as to restore that core to the alternate condition, the reverse of the reference condition in which it would otherwise be left at the end of the reading operation. In so-called coincident-current memories this operation consists in reversing the currents applied to read out of the given core. Since the currents used to read out of the given core produce a magnetomotive force such as to drive the core to the reference condition, reversal of those currents will produce a magnetomotive force such as to drive the core to the alternate condition.

The combination of currents used to read out of a particular core or group of cores is ordinarily generated by apparatus controlled by a particular combination of signals known as the memory address. It is frequently convenient to design such apparatus so that it first provides currents in given directions suitable to read out of a given core or group of cores, and then, either after a given time interval or at a given control signal, it provides currents equal in magnitude but reversed in direction in each case. Such a procedure will automatically restore each affected core from the reference condition to the alternate condition and, except for the modification hereinafter described, would destroy the information content of the cores with the minor difference that they would be left in the alternate condition instead of the reference condition. The modification applied to this procedure to make it fulfill its purpose of regenerating the information originally stored is the following:

The information read out of a core is stored in some device, usually bistable, which, if the core was in the reference state when read out, will, during the regeneration cycle, either inhibit the flow of some of the regenerating currents or will provide a magnetomotive force of such direction and magnitude as to keep the magnetomotive force from reaching a magnitude sufficient to drive the core to the alternate condition. If the core was in the alternate state when read out, the storage device will not inhibit its regeneration to the alternate state. An alternative form of operation is to provide for application of magnetomotive forces not quite sufficient to drive the affected core to the alternate condition unless the storage of a read-out signal in a storage device causes the storage device to provide additional magnetomotive force sufficient to make a total adequate to drive the core to the alternate state. The prior art shows many schemes of the foregoing kind, all having the common characteristic that regeneration is controlled by algebraic addition to or subtraction from the amplitude of the whole applied magnetizing field.

My invention comprises disposing conductors near magnetic elements so that the passage of current through the read or restoring conductor will produce a magnetic field nearly transverse to the magnetic axis (of easy magnetization) of the core, but with a small field component parallel to the magnetic axis so that passage of the current will rotate the magnetization to a position nearly but not quite transverse to the magnetic axis, and cessation of the current will permit the magnetization to rotate to the reference position, in the direction of the magnetic axis. It is important that the transverse field component be large relative to the parallel component. The transverse field component rotates the core magnetic flux to a state of high potential energy such that the relatively small parallel field component can determine the direction in which it will rotate back to an equilibrium state, or minimum of potential energy. By causing the read conductor to provide not only a large transverse field component but a small parallel field component, it is assured that the field from the read conductor alone will drive the core to the reference condition. However, by providing a control in the form of a polarizing conductor at right angles to the read conductor, it is possible to produce a parallel field component opposite to the parallel component from the read conductor, and larger in magnitude, so that a relatively small current through the polarizing conductor can inhibit the field of the read conductor from driving the core to the reference state, and will instead cause the core to be driven to the alternate state.

There is an important difference between the mode of operation of this invention and the prior art hereinbefore described. The prior art provides fields which are rendered either sufficient or insufficient to produce a magnetic effect by simple algebraic or scalar addition or subtraction of controlling fields. My invention employs a relatively large transverse field to bring the core into a state such that a relatively small parallel field can determine the final state to which it will subside. The control or polarizing field need not overcome the large transverse field, but provides only a relatively small parallel component. Thus, the power which must be applied to the core any time it is to be sensed and regenerated is of more or less conventional magnitude; but the controlling field whose presence or absence (or, alternatively, whose sign) must be controlled by the nature of the signal read out from the core has been much reduced, as contrasted with the power required by the methods of the prior art to achieve the same result.

An alternative form of my invention which may be preferable to meet particular requirements is as follows: The read conductor is located as nearly parallel as possible to the axis of easy magnetization of the magnetic element so that the field of the read conductor will be substantially orthogonal to the axis of easy magnetization of the element. The signal sensed upon the application of the read field will then be of the same waveform with respect to time regardless of the original state (reference or alternate) of the magnetic elements; but the polarity of the sensed signal will differ according to the initial state. Obviously, when the read field has rotated the magnetic vector of the magnetic element, such vector will be equidistant from the two possible rest positions to which it might return, and it will be necessary to apply a control in the form of a polarizing field of one sign or the other parallel to the axis of easy magnetization in order to determine the direction in which the vector will rotate and the final position to which it should return when the read field has been removed.

The above alternate procedure has the advantage over the form of my invention first described in that the read field may be removed before the polarizing field, and the polarizing field will then accelerate the return of the magnetic vector to its desired position. It will be apparent that the polarizing field of the alternative form of my invention replaces the polarizing field of the first form, and also replaces the parallel component of the read field as specified in the first form. In the second or alternate form of my invention, a higher degree of symmetry is obtained at the cost of regeneratively providing two polarities of polarizing signal rather than one polarity of polarizing signal. It will also appear that features of both forms of my invention may be combined by providing a read field as in the first form, with a component tending to drive the magnetic vector to the reference condition, and in addition thereto a bipolar regenerating signal which in one polarity will fulfill the duties of the polarizing signal as described in the first form of my invention and in the other polarity will act similarly to the polarizing signal of the second form and will expedite the return of the magnetic vector to the reference condition.

Accordingly, it is one important object of my invention to provide a magnetic element storage device in which the regeneration of information once read out may be accomplished rapidly.

Another important object of my invention is to provide a magnetic element storage device in which the direction of rotation of the magnetization of the storage element is controlled by a relatively small field approximately at right angles to the main field which determines that rotation shall occur.

Another important object of my invention is to provide a magnetic element storage device in which the reading out of a stored signal of either of two possible significances will produce an output confirmatory of the operation of the reading out circuit, and the significance of the signal read out may be determined by the polarity of the output signal.

A further object of the present invention is to provide an improved matrix of magnetic thin film elements utilizing the storage and read out techniques as herein taught.

Other objects and benefits of my invention will become apparent in the course of the following description.

FIG. 1 represents a magnetic core with two conductors in proximity to it, suited to illustrate certain details of my invention;

FIG. 2 represents a somewhat idealized hysteresis loop of a thin-film core suited to the practice of my invention;

FIG. 3 represents the magnetization of a core in the alternate condition or "one" state;

FIG. 4 represents the magnetization of a core in the reference condition or "zero" state;

FIG. 5 represents the magnetization of a core under the influence of the field from the read conductor, as applied in the practice of my invention;

FIG. 6 represents the current pulse applied to the read conductor and the output voltage sensed for the two possible original states of the core, in the practice of my invention;

FIG. 7 represents a magnetic core with three conductors in proximity to it, according to one embodiment of my invention;

FIGS. 8, 9, 10, 12, 14 and 16 represent states of magnetization of the core under various conditions of operation in accordance with my invention;

FIGS. 11, 13, 15 and 17 represent input and output waveforms corresponding to different modes of operation in accordance with my invention.

Figure 18:
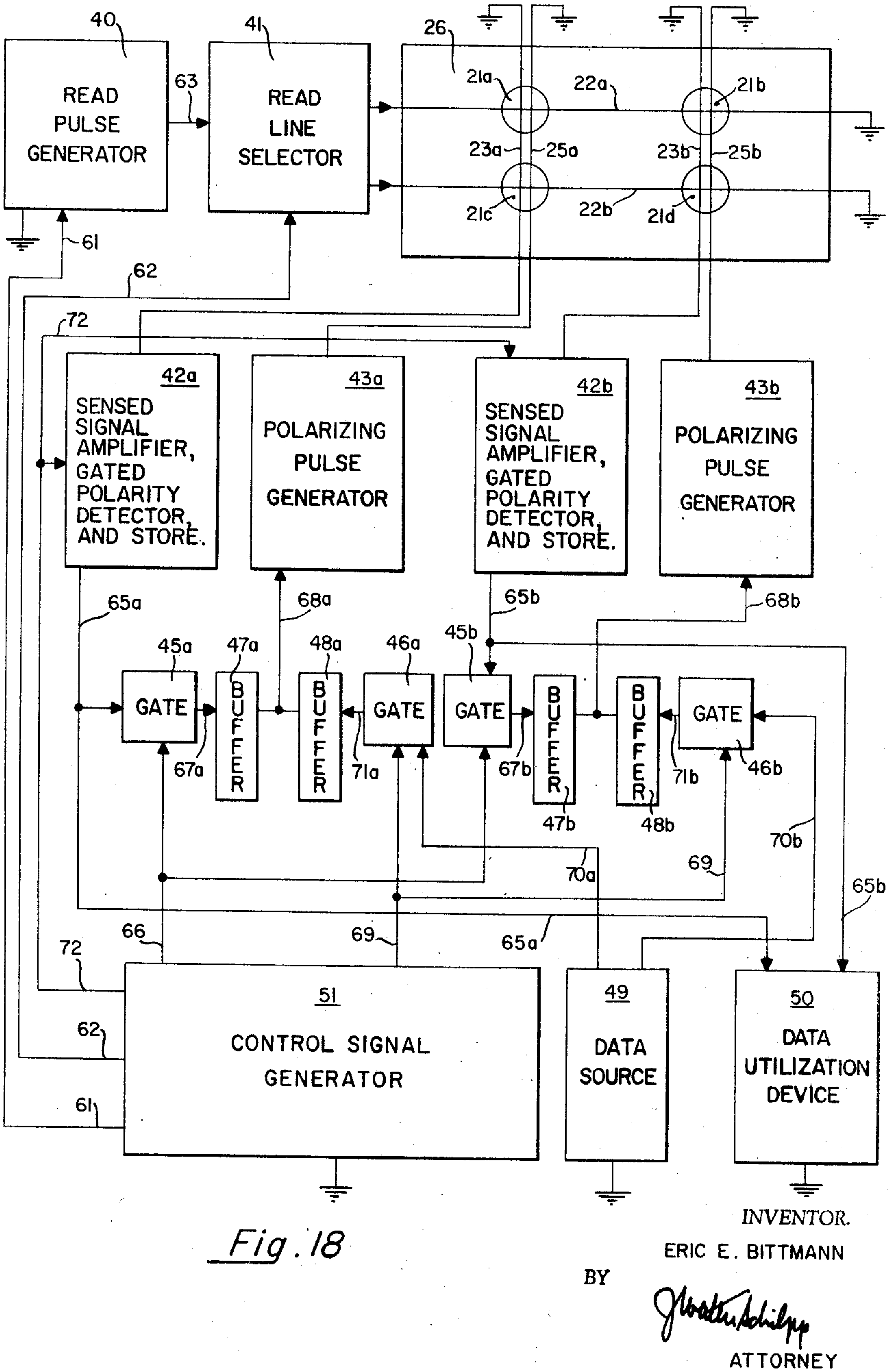
FIG. 18 shows one form of system in which my invention may be used.

In FIG. 1, there is shown a bistable magnetic core 21 comprising a thin film, preferably of circular (i.e. disk) configuration, of magnetizable material of high retentivity having a preferred or easy axis of magnetization given it by known methods and indicated by the arrow 24. Read conductor 22 is shown as generally (but intentionally not exactly) parallel to the preferred axis 24. Sense conductor 23 is positioned as nearly as possible at right angles to read conductor 22, in accordance with the teaching of the copending application of Rexford G. Alexander, Jr., filed Mar. 31, 1958, and now U.S. Pat. No. 3,154,765, and assigned to the assignee of this application.

In FIG. 1, several lettered points are shown on the circumference of core 21, and have the following significance: Each point indicates a location of the north-seeking or north pole of the magnet formed by the core 21 in various states of magnetization. Point A represents the location of the north pole when the core 21 is the alternate (i.e. alternate from reference) or "one" magnetic state or condition. Point R represents the location of the north pole when core 21 is in the reference or "zero" condition. Note that points A and R are located on the preferred magnetic axis 24. Point D represents the approximate location of the north pole when a magnetic drive field is applied to core 21 by passage of conventional current upward through read conductor 22 in a direction from the bottom to the top of the drawing. This direction of drive field results from the fact that read conductor 22 is, in FIG. 1, located above the disc core 21. As a matter of fact, all of the conductors in each of FIGS. 1, 7, 8, 9, 10, 12, 14 and 16 are shown as being above the core 21.

FIG. 2 represents the somewhat idealized hysteresis loop of the thin film core 21, showing thereon points A' and R' corresponding to the points A and R in FIG. 1.

FIG. 3 illustrates, by means of a symbolic compass needle 31, the direction of magnetization of core 21 when in the alternate or "one" condition, the compass needle being shown with the north pole, shaded, at point A.

FIG. 4 illustrates the same core 21 when in the reference or "zero" state, with the north pole of the compass needle 31 at point R.

FIG. 5 illustrates the same core 21 when the magnetic drive field of the read conductor 22 is applied, with current flow upward through conductor 22 being assumed. Note that the symbolic compass needle 31 is now turned with its north pole at point D.

FIG. 6(*a*) represents the waveform of read current, amplitude versus time, with the read current flowing, in FIG. 1, upward through conductor 22.

FIG. 6(*b*) shows, against the same time abscissa as used in FIG. 6(*a*), the voltage induced in the sense conductor 23 of FIG. 1, assuming that at the time T1 (i.e. at the instant of application of the leading edge of the read current pulse), the core 21 was in the alternate or "one" condition, as represented in FIG. 3. It will be seen that, in response to the field of the read current, the magnetic field of core 21 will be driven rotationally in a counter clockwise direction, from the "one" stable state represented in FIG. 3 to the unstable condition represented in FIG. 5 and that the linkage of flux of core 21 with sense conductor 23 will first increase and then decrease. Thus immediately after time T1 there is induced in sense conductor 23 a small negative voltage followed immediately by a larger positive voltage as the magnetization of core 21 rotates under the field produced by the read-out drive current represented in FIG. 6(*a*).

FIG. 6(*c*) illustrates, with the same time abscissa common also to FIGS. 6(*a*) and 6(*b*), the voltage induced in the sense conductor 23 if the core 21, at the time T1, is in the reference or "zero" condition represented by FIG. 4. In this case, the application of the field produced by the current wave illustrated in FIG. 6(*a*) causes the core 21 to pass by clockwise flux rotation from the "zero" stable state represented by FIG. 4 to the unstable condition represented by FIG. 5. In such a transition, the flux linkages with sense conductor 23 decrease continuously during the transition, but because the direction of the flux change is opposite to that described in connection with FIG. 3, the decrease of flux linkages induces a voltage of the same sign as that initially induced in the transition represented in FIG. 6(*b*) by a momentary increase in flux linkages. Therefore the induced voltage represented in the initial portion of FIG. 6(*c*) is negative.

It will be seen that regardless of the initial condition of core 21, immediately after the read current represented in FIG. 6(*a*) has had its full effect, the core will be in the unstable condition represented in FIG. 5, and that when, at time T2, the current represented in FIG. 6(*a*) falls to zero, core 21 will spontaneously return to its nearest stable condition, which in the present case is the reference or "zero" state, represented in FIG. 4. The transition from the magnetic condition of FIG. 5 to that of FIG. 4 will cause a change in flux linkages with sense conductor 23 which will be the reverse of that produced by the transition from the condition of FIG. 4 to that of FIG. 5, but which will be the same as that produced during the latter portion of the transition from the condition of FIG. 3 to that of FIG. 5. Accordingly, immediately after time T2 when the current represented in FIG. 6(*a*) is returning to zero, both FIG. 6(*b*) and FIG. 6(*c*) show induced voltage pulses of positive polarity.

It will be seen from the foregoing description that the application of read current, as represented in FIG. 6(*a*), to the read conductor 22 will induce in sense conductor 23 voltages which are detectably different according to the remanent state of the core 21; and that the removal of the read current will permit the core to change spontaneously from the condition portrayed in FIG. 5 to that portrayed in FIG. 4, with a corresponding induction in sense conductor 23 of a voltage having no significance except as it indicates that this change of condition is occurring.

Consider now the means that should be provided for placing the core 21 in the "one" condition illustrated in FIG. 3. The conventional method of the prior art would be simply to drive a reverse or downward current through read conductor 22, and thus force core 21 to assume the condition indicated in FIG. 3. This is one method, but it requires the reversal or non-reversal of current in read conductor 22 according to the information to be entered or regenerated in core 21, while the application of read current in the forward direction to read conductor 22 depends logically simply upon the fact that core 21 is to be restored to its reference state to determine its logical content. Stated briefly, the criteria requiring reverse current in conductor 22 are different from those requiring forward current.

FIG. 7 illustrates a physical arrangement of a supporting base 26, carrying a thin-film magnetic core 21, in proximity to which there pass a read conductor 22, sense conductor 23, and polarizing conductor 25 here illustrated as being parallel to sense conductor 23. It will be understood that all conductors are insulated from each other and from any conducting paths which could bypass current flowing through the conductors by means not shown. Base 26 is of non-magnetic material and preferably, though not necessarily, is also non-conductive. The axis of easy magnetization represented by arrow 24 in FIG. 1 is omitted in FIG. 7 to avoid confusion of lines but is to be considered as having the same orientation relative to conductors 22 and 23 as is indicated in FIG. 1. It is clear that if no current be passed through polarizing conductor 25, the operations above described with references to FIGS. 1, 3, 4, 5 and 6 may be performed with the arrangement indicated in FIG. 7, and like results obtained. FIG. 8, for greater clarity, shows core 21 and the symbolic compass needle 31 as in FIG. 5, but with read conductor 22 superimposed. FIG. 9 represents core 21 and symbolic compass needle 31 under the combined influence of a magnetic field produced by current moving upward in read conductor 22 and a magnetic field produced by current moving from left to right (in FIG. 9) in polarizing conductor 25, this latter field being upward in the plane of core 21. The resultant magnetic field is in the direction indicated by the symbolic compass needle 31, with its north pole at point F. The critical characteristic of point F for the purposes of my invention is that the arc from point F to point A corresponds to an angle of less than ninety degrees, i.e. the fourth part of a circle. Phrased alternatively, in FIG. 9 the axis of the symbolic needle 31 makes an angle with the magnetic axis represented by arrow 24 such that the north pole of symbolic compass needle 31 is closer to point A than it is to point R. The purpose of this condition is to assure that, when the read and polarizing currents in conductors 22 and 25, respectively, are reduced to zero, the core 21 will spontaneously assume the condition represented in FIG. 10 wherein the north pole of compass needle 31 is shown as coinciding with point A, indicating that the core 21 has returned to the alternate or "one" condition, rather than to the reference or "zero" condition to which it would have returned upon application of the read current alone. By mechanical analogy, the effect is similar to what might be achieved by raising one end of a horizontal pole from the ground with a hoist which tended to pull the pole end over past top center. If the pole were then permitted to return to the ground, it would return in an aspect opposite to its initial one. But a relatively small horizontal thrust, analogous to the field component produced by the current in polarizing conductor 25, could force the pole's upper end to move to the other side of top center, so that it would fall back to its original position when released.

It is apparent from the preceding description of the functioning of the polarizing conductor 25 that it is not essential that polarizing conductor 25 be parallel to sense conductor 23 nor that it be at right angles to read conductor 22. Ideally, for maximum effect, polarizing conductor 25 ought actually to be at right angles to the magnetic axis of core 21; but as a matter of convenience, it may often be found desirable to make it parallel to the sense conductor 23, as represented in FIG. 7. It is the magnetic field component parallel to the magnetic axis of core 21, produced by current flowing in polarizing conductor 25, which produces the effect desired from the polarizing conductor 25. This parallel field component is proportional to the cosine of the angle by which the position of polarizing conductor 25 deviates from the ideal position hereinbefore described; since the cosine remains nearly one for reasonably large angles, the effectiveness of conductor 25 is not very sensitive to small angular displacements.

While, for simplicity, the preceding has been written with the assumption that the magnetization of core 21 will move spontaneously so that if no polarizing current is driven through polarizing conductor 25, the north pole of symbolic compass needle 31 will return to point R, as in FIGS. 5 and 4, it is obviously possible to apply to polarizing conductor 25 a reverse polarity of current so that the magnetic vector represented by needle 31 will be moved to a point intermediate between D and R, and therefore will have a smaller angle through which to move to return to R. Its return will thus be faster, and higher speed of operation will be possible.

Alternatively, the axis of easy magnetization may be parallel to read conductor 22; the field from conductor 22 will then drive the magnetic vector of core 21 to a position midway between its two equilibrium positions. In such case, the direction to which the magnetization will return when the field of conductor 22 is removed will be uncertain and it is necessary that polarizing conductor 25 be capable of setting up a field of either polarity so that it can direct the return of the magnetic vector of core 21 in either direction, according to logical requirements. In such instance, the field of conductor 22 may be removed before the termination of current in conductor 25.

FIG. 11 illustrates certain aspects of one possible mode of operation of my invention. Time, increasing to the right, is a common abscissa of FIGS. 11(*a*), 11(*b*) and 11(*c*). FIG. 11(*a*) represents current through read conductor 22, as in FIG. 6(*a*). It is assumed that the core 21 had been at time T1 in the alternate or "one" condition, corresponding to point A in FIG. 12. Therefore, the voltage induced immediately after time T1 in sense conductor 23 is, as portrayed in FIG. 11(*c*), a small negative pulse succeeded immediately by a larger positive pulse, identically like the first portion of FIG. 6(*b*). It is this larger positive pulse which is taken as the output signal of the sense conductor. The magnetic field vector represented by symbolic compass needle 31 will, following time T1 and as shown in FIG. 12, have moved counterclockwise to point D. Next, starting at time T2, the polarizing current through conductor 25, represented by FIG. 6(*b*), rises from zero, and produces a magnetic field which causes the magnetization of the core 21 to shift clockwise from point D to point F. The corresponding change in flux linkages with the sense conductor 23 cause the induction of a small negative voltage portrayed in FIG. 11(*c*) starting at time T2. Without interruption or reversal of the read current portrayed in FIG. 11(*a*), the magnetization of core 21 has been so altered that, when the read current and the polarizing current fall to zero after time T3, as shown in FIGS. 11(*a*) and 11(*b*), the magnetization of core 21 will fall to point A, FIG. 12. In other words, the initial alternate or "one" state of the core has been regenerated. A small negative voltage will be induced in the sense conductor at time T3 as shown in FIG. 11(*c*).

FIG. 13 illustrates the reading and writing of the reference or "zero" state of the core 21, corresponding to the magnetization state indicated by the point R of FIG. 14, being the north pole of the core 21. At time T1, the read current shown in FIG. 13 rises and causes the north pole of core 21 to move clockwise to point D of FIG. 14, the change of flux linkages with sense conductor 23 causing the induction therein of a small negative pulse of voltage shown in FIG. 13(*c*), beginning at time T1. It is this negative pulse, following time T1, which is taken as the output signal of the sense conductor. Since it is not necessary to inhibit the return of core 21 to the reference or "zero" state, corresponding to its north pole being at point R, no polarizing current is required at time T2 in FIG. 13(*b*), and nothing occurs until, at time T3, the read current indicated by FIG. 13(*a*) falls to zero. The spontaneous counterclockwise return of the north pole of core 21 to point R then occurs and causes changes in flux linkage which induce at time T3 of FIG. 13(*c*) a small positive pulse in sense conductor 23. The wave shapes of FIG. 6(*a*) and FIG. 13(*a*), and the wave shapes of FIG. 6(*c*) and FIG. 13(*c*), are identical except for the insignificant difference in arbitrary time scale.

It will be seen from the above that FIGS. 11, 12, 13 and 14 illustrate the reading (which takes place immediately following time T1) and the writing or regeneration of either of the two stable states of core 21 using single-polarity read pulses. These figures represent one embodiment of my invention for storing, recovering and regenerating binary information. This embodiment is characterized by the fact that the read current is a single unidirectional pulse which provides power to read out stored information of either polarity and continues long enough to permit the regeneration of the information read out or the writing of new information. This is of particular benefit if a number of units of stored information are to be read out and regenerated or new information is to be written in, in time parallel. Under such circumstances, the rise of the read current may be slow, so that there is a considerable benefit in the possibility of performing two operations during the period of a single, unaltered, pulse.

However, if read pulses are to be obtained from a pulse transformer, the problem of so-called direct-current restoration is simplified if an output symmetrical about zero can be used, that is, if the algebraic sum of the volt-seconds output is zero. FIGS. 15, 16 and 17 indicate a mode of operation of my invention employing such symmetrical read pulses. FIGS. 15(*a*) and 17(*a*) represent the same form of read current, rising positively at T1, falling to a negative value at T2, and rising to zero at T3.

FIG. 16 illustrates the various conditions of core 21 when operated according to the modes illustrated in FIGS. 15 and 17. It is assumed that at time T1 of FIG. 15, the core 21 is so magnetized that the north pole of the symbolic compass needle 31 is at point A, corresponding to magnetization in the alternate or "one" state. Immediately after time T1 the read current rises as indicated in FIG. 15(*a*) and the magnetic flux vector rotates counterclockwise so that the north pole of 31 moves to point D. The change in flux linkages between sense conductor 23 and the flux from core 21 causes the induction in sense conductor 23 of the bipolar voltage immediately following T1, as shown in FIG. 15(*c*). The positive pulse following time T1 is taken as the sensed output signal. At time T2, the read current falls, as shown in FIG. 15(*a*), to a negative amplitude equal to its previous positive amplitude. The consequent reversal of the field of conductor 22 causes the magnetic vector of core 21 to move counterclockwise, the north pole of symbolic compass needle 31 moving from point D of FIG. 16 to point E with consequent induction in sense conductor 23 of the bipolar voltage shown in FIG. 15(*c*) immediately after time T2. At time T3, the read current returns to zero as indicated in FIG. 15(*a*), and the north pole of the compass needle 31 symbolizing the magnetic flux vector of core 21 moves counterclockwise from point E of FIG. 16 to point A. Core 21 has thus been restored to its original state of magnetization. A small pulse voltage, indicated at T3 of FIG. 15(*c*) will be induced in sense winding 23 by the counterclockwise rotation of the flux of core 21 which has been described as occurring at time T3 of FIG. 15.

In FIG. 17, prior to time T1, core 21 is assumed to be so magnetized that the north pole of symbolic compass needle 31 is at point R, corresponding to a reference or "zero" state of magnetization. As in FIG. 15(*a*), the read current shown by FIG. 17(*a*) rises immediately after time T1. The magnetic flux of core 21 of FIG. 16 will move clockwise, the north pole of symbolic compass needle 31 moving from point R to point D, the resultant changes in flux linkage causing the induction in sense conductor 23 of the negative voltage pulse shown in FIG. 17(*c*) as occurring immediately after time T1. The output is taken from the sense conductor 23 at this time. At time T2 of FIG. 17, the read current indicated in FIG. 17(*a*) falls as in FIG. 15(*a*), but at time T2, the polarizing current represented in FIG. 17(*b*) falls to a negative value. The significance of the negative sign of the polarizing current is that the direction of flow of conventional current in polarizing conductor 25 is the opposite of the direction from left to right previously taken as standard. The actual direction of flow of conventional current in conductor 25 in this instance is from right to left, as shown in FIG. 16. Such flow of polarizing current produces a magnetizing field component which, in the plane of core 21, is downward in FIG. 16. The negative read current shown in FIG. 17(*a*) after time T2 but before time T3 is such as, in the absence of polarizing current, would cause the magnetization of core 21 to rotate counterclockwise from point R to point E in FIG. 16. This has been explained in connection with FIG. 15, which differs from FIG. 17 only in that the polarizing current, in FIG. 15 is absent. The presence of the negative polarizing current shown in FIG. 17(*b*) between times T2 and T3 prevents the magnetization of core 21 from rotating (in response to the read current) counterclockwise so far as point E and holds it at point G. The voltage induced in sense conductor 23 is bipolar as indicated in FIG. 17(*c*) immediately after time T2. When, immediately after time T3, the read current indicated in FIG. 17(*a*) and the polarizing current indicated in FIG. 17(*b*) both rise to zero, the magnetization of core 21 relapses in a clockwise direction from point G of FIG. 16 to point R. The consequent flux changes induce in sense conductor 23 the bipolar voltage wave indicated in FIG. 17(*c*) at time T3.

It will be seen that FIGS. 15, 16 and 17 illustrate the reading and the writing or regeneration of both possible states of core 21, using a bipolar read current pulse wave. These figures thus teach the mode of operation of the second or alternate embodiment of my invention to store, recover, and regenerate binary information.

The basic principles of my invention may be applied in many ways which will appear to those skilled in the art. FIG. 18 illustrates a magnetic element data storage system according to my invention. Since a number of identical elements are illustrated, elements of a given kind and performing the same function are given identical numbers but individually identified by letter postscripts. Thus, the four thin-film cores, all identical with the core marked with number 21 in preceding figures, are numbered, respectively, **21*a*, 21*b*, 21*c* and 21*d***.

In FIG. 18, there is shown an assembly of four thin-film cores **21*a*, 21*b*, 21*c* and 21*d*, each having the same characteristics as core 21 of FIG. 7. These cores are mounted on base 26, on which read conductors 22*a* and 22*b*, sense conductors 23*a* and 23*b*, and polarizing conductors 25*a* and 25*b* are supported in insulating relation with respect to each other by insulating means not shown, each named conductor being oriented with respect to each core over which it passes in the same manner as its cognate conductor in FIG. 7 is oriented with resepct to core 21 of FIG. 7. In other words, the unit assembly delineated in FIG. 7 is repeated four times in FIG. 18. Other elements of the system are indicated by rectangles and identified functionally because the art is rich in widely known ways of performing these functions. Control signal generator 51** is here assumed to be capable of generating internally actuating or timing signals for causing it to perform its functions in proper sequence, which proper sequence will appear from the further description. The sequences of operations to be performed by the arrangement of FIG. 18 will be those indicated by FIGS. 11, 12, 13 and 14, plus the various auxiliary and ancillary operations necessary to permit such performance, and to utilize such performance.

Control signal generator 51 first transmits by conductor 61 a control signal to read pulse generator 40, causing it to emit a read pulse like that shown in 11(*a*). Simultaneously, control signal generator 51 transmits by conductor 62 to read line selector 41 a control signal which causes read line selector 41 to transmit to the desired one of read conductors 22*a* and 22*b* the read pulse which read pulse generator 40 transmits by conductor 63 to read line selector 41. Let it be assumed that the read pulse current is transmitted through read conductor 22*a* from left to right. Cores 21*a* and 21*b* will be driven by rotation to the quasi-metastable position associated with point D of FIGS. 12 and 14. Let it be assumed that core 21*a* was originally in the alternate or "one" condition, and that core 21*b* was originally in the reference or "zero" condition. Then there will be induced in sense conductor 23*a* a voltage corresponding to FIG. 11(*c*) after time T1, and there will be induced in sense conductor 23*b* a voltage corresponding to that of FIG. 13(*c*) after time T1. Since the ends of conductors 23*a* and 23*b* are grounded, as indicated by conventional symbols, these induced voltages will appear at the respective inputs to the sensed signal amplifiers included in rectangles 42*a* and 42*b*. These amplifiers may be of conventional electron tube or transistor variety. Their function is merely to amplify the sensed voltage, so that it may drive a gated polarity detector and store, all of which is included in the same rectangles 42. The gating or coincidence function is readily performed by a diode gate, well known in the computer art. Since it is only immediately after time T1 of FIGS. 11 and 13 that the sensed voltage is significant, it is necessary to permit the transmission of the amplified sensed voltage from the sensed signal amplifier to the polarity detector and store only at the time described. Control signal generator therefore generates and transmits through conductor 72 to the gates of 42*a* and 42*b* a permissive signal which rises simultaneously with the read current pulse at time T1, but falls to zero before time T2 of FIGS. 11 and 13. Thus, only the significant sense signal is transmitted from the sensed signal amplifier to the polarity detector and store. The polarity detector and store is a bistable circuit designed so that an input pulse of one polarity will drive it to a given stable state, and an input pulse of the opposite polarity will drive it to the opposite stable state. Such circuits are described and discussed in "Waveforms," vol. 19 of the Radiation Laboratory Series published by McGraw-Hill Book Company of 330 W. 42 St., New York, N.Y.

The operation described thus far is, in summary, that signals from the control signal generator 51 have caused the generation of a read pulse of current, controlled its direction to the selected conductor 22*a*, and caused the restoration of cores 21*a* and 21*b*, with consequent induction in sense conductors 23*a* and 23*b* of voltages indicative of the original state of cores 21*a* and 21*b*, respectively. These induced voltages have been amplified by sensed signal amplifiers and gated thence by a gating signal generated by control signal generator 51 to the associated polarity detector and store. The net result of this operation is that cores 21*a* and 21*b* are devoid of the information they originally stored, but that information is indicated by the condition of the stores in units 42*a* and 42*b*. At time T2 of FIGS. 11 and 13, the gating signal on conductor 72 will have disappeared. Control signal generator 51 will transmit to gates 45*a* and 45*b* by conductor 66 a gating signal permitting the state of the stores of 42*a* and 42*b* to be communicated through buffers 47*a* and 47*b*, respectively, to polarizing pulse generators 43*a* and 43*b*, respectively. In consequence, since core 21*a* was originally in the alternate or "one" condition polarizing pulse generator will generate a pulse like that represented by FIG. 11(*b*), and at time T3 core 21*a* will be returned to the alternate or "one" condition. Since core 21*b* was originally in the reference or "zero" condition, polarizing pulse generator 43*b* will generate no pulse, consistently with FIG. 13(*b*), and core 21*b* will return at time T3 to the reference or "zero" condition. At time T3 the read pulse and the polarizing pulse will both become zero in any case.

Alternatively, the polarizing pulse generators may be so constructed that, to regenerate the reference condition more rapidly, they generate a pulse of the same duration as that required for regenerating the alternate condition, but of reversed polarity. As explained in the preceding, this permits faster return of the core to the reference condition. It also permits a construction in which the axis of easy magnetization of the core is parallel to the read conductor 22, with sense conductor 23 and polarizing conductor 25 being at right angles to read conductor 22; in this last case, the polarizing signals generated by the polarizing pulse generators may be caused to continue after the termination of the read signal in conductor 22. This mode of operation is that described in the preliminary description as the alternative form.

It has been explained how the information content of cores under a selected read conductor has been determined, stored, and regenerated in the cores. The outputs of the stores in 42*a* and 42*b* are connected by conductors 65*a* and 65*b* with data utilization device 50, which receives signals continuously on the latest information content of the store. It is apparent that control signal generator 51 may, by its control of read line selector 41 determine whether cores 21*a* and 21*b* or cores 21*c* and 21*d* are selected for reading, writing, or regeneration. The sequence of operations determined by control signal generator 51 will be as determined by the needs of data utilization device 50, and the characteristics of data source 49. When new information is to be written into the cores 21*a*, 21*b*, 21*c* and 21*d*, control signal generator 51 by signal applied through conductor 61 to read pulse generator and by signal applied through conductor 62 to read line selector 41 causes the appropriate read conductor 22*a* or 22*b* to receive a read current pulse. At time T2 the control signal generator 51 does not provide a gating signal on conductor 66 to gates 45*a* and 45*b*, but instead provides a gating signal on conductor 69 to gates 46*a* and 46*b*, whereby the signals from the data source 49 are permitted to pass by conductors 70*a* and 70*b*, respectively, through gates 46*a* and 46*b*, respectively, thence by conductors 71*a* and 71*b*, respectively, through buffers 48*a* and 48*b*, respectively, by conductors 68*a* and 68*b*, respectively, to polarizing pulse generators 43*a* and 43*b*, respectively. The functioning of the system from this point on is similar to that described for regeneration of data in the cores. The difference between regeneration and writing of new data consists only in the provision of different signal paths for the control of the polarizing pulse generators by different signal sources.

Thus it has been explained how the embodiment of FIG. 18 may be made to perform the functions of binary information storage, recovery and regeneration. The nature of the computing and data processing and control and allied arts is such that those skilled in the art may, with the teaching of my invention, produce many variations suitable for particular purposes, all coming within the scope of my invention.

The extreme flexibility of the electrical art renders the possible equivalents of any means cited in the teaching literally almost innumerable; without limiting myself hereto, I observe that any discrete magnetic element having the property of rotational switching approximately in a plane as herein described can perform functions the equivalent of the cores specifically described herein. Furthermore, the magnetic fields produced by given currents and conductors may obviously be replaced by separate elements producing component fields whose resultant will be equivalent to a given field herein specified. Alternatively, since sense conductor 23 and polarizing conductor 25 may be similarly oriented, but function at different times, a single conductor with suitable switching means is equivalent to, and may be substituted for, the two separate conductors represented in the figures.

What is claimed is:

1. A binary data storage device comprising at least one substantially plane ferromagnetic thin film element capable of attaining opposed states of residual flux density along an axis of easy magnetization, said magnetic flux of said ferromagnetic element being capable of being rotated in the plane of said element by the application of magnetizing fields from external sources, at least first and second electrical conductors located in proximity to, but not passing through, said ferromagnetic element, said first conductor being disposed along a path slightly skewed a predetermined angle from said axis of easy magnetization so that the flow of current therethrough establishes a first magnetizing field at substantially a right angle to said axis, but slightly skewed from said right angle so as to have a small axial component of a predetermined magnitude, said second conductor being disposed substantially perpendicular to said axis of easy magnetization so that the flow of current therethrough establishes a second magnetizing field substantially parallel to said axis, said second magnetizing field being smaller in absolute magnitude than said first magnetizing field, but being at least as large as the small axial component of said first magnetizing field, means for selectively producing current flow through said first conductor to establish said first magnetizing field in the plane of said ferromagnetic element, means for selectively producing current flow through said second conductor to establish said second magnetizing field in the plane of said element to cause the magnetic flux of said magnetic element, upon cessation of said first magnetizing field, to return to one of said states of residual flux density.

2. A binary storage device as defined in claim 1, wherein the means for producing current flow in the second conductor produces a unidirectional current flow, which, in turn, produces a second magnetizing field which is unidirectional and substantially opposite in direction to the small axial component of said first magnetizing field, but larger than said small axial component.

3. A binary storage device as defined in claim 1, wherein the means for producing current flow in the second conductor produces current flow in either one direction or the opposite direction through said second conductor, which current flow, in turn, produces a second magnetizing field which is either in substantially the same direction as that of the small axial component or in substantially the opposite direction.

4. A memory system comprising, in combination, a thin film memory array including rows and columns of discrete thin film magnetic elements, said elements having an easy direction of magnetization and being capable of residing in bistable flux storage states in a first or opposite direction along said easy direction of magnetization, a plurality of row drive conductors coupled to the magnetic elements of the respective rows, each said row conductor being skewed slightly out of alignment a predetermined amount with the easy direction of magnetization of the elements of its rows, a plurality of sense conductors, a plurality of column polarizing conductors coupled to the magnetic elements of respective ones of said columns and substantially oriented at right angles with said easy direction of magnetization, drive conductor selector means connected to said plurality of row conductors, sense amplifier means connected to said sense conductors, polarizing generator means connected to said polarizing conductors, control means enabling said drive conductor selector means to provide drive current along a selected one of said row conductors causing the domains of the selected magnetic elements to rotate to a position substantially at a right angle to said easy direction of magnetization, but slightly skewed from said right angle to have a predetermined small axial component, said control means further causing said polarizing generator means to provide currents along said column polarizing conductors in a first or second direction, whereby the stable state which the domains assume is determined by the direction of the axial field component created by the current flow through the row conductor and the direction of the field created by the current flow through the polarizing conductor.

References Cited

UNITED STATES PATENTS

| | | | |
|---|---|---|---|
| 2,691,155 | 10/1954 | Rosenberg et al. | 340—174 |
| 3,030,612 | 4/1962 | Rubens et al. | 340—174 |

FOREIGN PATENTS

| | | |
|---|---|---|
| 763,038 | 12/1956 | Great Britain. |

OTHER REFERENCES

Publication I: A Compact Coincident Current Memory, by Pohm et al., Proceedings of the Eastern Joint Computer Conference, Dec. 10–12, 1956.

Thin films, Memory Elements . . . , published in "Electrical Manufacturing," January 1958, vol. 61, No. 1.

Publication III: "Reversible Rotation in Magnetic Films," published in "Journal of Applied Physics," March 1958, vol. 29, No. 3, pp. 288–289.

JAMES W. MOFFITT, Primary Examiner